(12) United States Patent
Raju et al.

(10) Patent No.: US 8,208,274 B2
(45) Date of Patent: Jun. 26, 2012

(54) ALTERNATING CURRENT TO DIRECT CURRENT POWER CONVERSION

(75) Inventors: Ravisekhar Nadimpalli Raju, Clifton Park, NY (US); Luis Jose Garces, Niskayuna, NY (US); Robert Louis Steigerwald, Burnt Hills, NY (US); Michael Joseph Schutten, Rotterdam, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/096,005

(22) Filed: Apr. 28, 2011

(65) Prior Publication Data

US 2012/0092898 A1 Apr. 19, 2012

(51) Int. Cl.
*H02M 3/335* (2006.01)
*H02M 7/5387* (2007.01)

(52) U.S. Cl. ............................... 363/17; 363/132
(58) Field of Classification Search .............. 363/16, 363/17, 65, 67, 69, 97, 98, 131, 132
See application file for complete search history.

(56) References Cited

U.S. PATENT DOCUMENTS

| | | | |
|---|---|---|---|
| 5,701,243 A | 12/1997 | Youn et al. | |
| 5,852,555 A * | 12/1998 | Martin | 363/71 |
| 6,005,780 A | 12/1999 | Hua | |
| 6,118,673 A | 9/2000 | Hua | |
| 6,636,430 B1 | 10/2003 | Batarseh et al. | |
| 7,808,125 B1 * | 10/2010 | Sachdeva et al. | 307/82 |
| 7,872,425 B2 * | 1/2011 | Ger et al. | 315/219 |
| 8,026,639 B1 * | 9/2011 | Sachdeva et al. | 307/82 |
| 2010/0109571 A1 * | 5/2010 | Nishino et al. | 315/307 |
| 2010/0142240 A1 * | 6/2010 | Lee et al. | 363/132 |
| 2011/0221195 A1 * | 9/2011 | Raju | 290/44 |

OTHER PUBLICATIONS

Ravisekhar Nadimpalli Raju; Title : System and Method for Power Conversion; U.S. Appl. No. 13/075,224, filed Mar. 30, 2011; 23 Pages.

* cited by examiner

*Primary Examiner* — Matthew Nguyen
(74) *Attorney, Agent, or Firm* — Ann M. Agosti

(57) ABSTRACT

An alternating current to direct current (AC to DC) power conversion system is provided. The system includes a rectifier configured to convert an input AC voltage to an initial pulsating DC voltage. The system also includes an inverter configured to convert the initial pulsating DC voltage to a converted AC voltage. The system further includes a plurality of transformers, each transformer including a primary winding paired to a secondary winding, wherein each of the primary windings is coupled in series with the other primary windings, wherein the series coupled primary windings are coupled to the inverter to receive respective portions of the converted AC voltage. The system also includes a plurality of bridges, each bridge coupled to a respective secondary winding configured to receive a respective portion of a transformed AC voltage from the respective secondary windings, and coupled in parallel to the other bridges to provide a combined DC output voltage.

20 Claims, 4 Drawing Sheets

ALTERNATING CURRENT TO DIRECT CURRENT POWER CONVERSION

STATEMENT REGARDING GOVERNMENT INTERESTS

This invention was made with Government support under Contract No. N00014-07-C-0415 awarded by the Office of Naval Research. The Government has certain rights in the invention.

BACKGROUND

Embodiments of the present invention relate generally to alternating current to direct current (AC to DC) power conversion.

AC to DC converters convert input AC power to output DC power. In one conventional approach to AC to DC power conversion, an AC to DC converter includes a diode rectifier with a pulse-width-modulated boost stage for converting the input AC voltage to an intermediate stiff DC voltage and for shaping the input AC current to have unity power factor. The intermediate stiff DC voltage is further processed by a transformer-isolated DC-DC converter with suitable gain to provide a DC output voltage to the load. This conventional approach often requires large filters and has poor efficiency due to multiple stages of power conversion and hard-switching of the semiconductor switches.

Hence, there is a need for an improved system to address the aforementioned issues.

BRIEF DESCRIPTION

In one embodiment, an alternating current to direct current (AC to DC) power conversion system is provided. The system includes a rectifier configured to convert an input AC voltage to an initial pulsating DC voltage. The system also includes an inverter configured to convert the initial pulsating DC voltage to a converted AC voltage. The system further includes a plurality of transformers, each transformer comprising a primary winding paired to a secondary winding, wherein each of the primary windings is coupled in series with the other primary windings, wherein the series coupled primary windings are coupled to the inverter to receive respective portions of the converted AC voltage. The system also includes a plurality of bridges, each bridge electrically coupled to a respective secondary winding configured to receive a respective portion of a transformed AC voltage from the respective secondary winding, and coupled in parallel to the other bridges to provide a combined DC output voltage.

In another embodiment, a method for power conversion is provided. The method includes converting an input AC voltage to an initial pulsating DC voltage. The method also includes converting the initial pulsating DC voltage to a converted AC voltage. The method further includes splitting the converted AC voltage into a plurality of portions of the converted AC voltage. The method also includes altering a voltage level of at least some of the respective portions of the converted AC voltage to provide portions of transformed AC voltage. The method further includes converting the respective portions of the transformed AC voltage to respective portions of an output DC voltage. The method also includes combining the respective portions of the output DC voltage to provide a combined output DC voltage.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention include an alternating current to direct current (AC-DC) power converter. The AC-DC converter includes a rectifier that converts an input AC voltage to an initial DC voltage. The initial DC voltage is transferred to an inverter that converts the initial DC voltage to an AC voltage. The converted AC voltage is split to multiple portions that are transmitted to a plurality of respective transformers. Each of the plurality of transformers includes a primary winding paired to a secondary winding. The primary windings of each of the transformers are series connected and receive the respective portions of the converted AC voltage. The respective portions of the AC voltage are transferred to the respective secondary windings resulting in a respective portion of a transformed AC voltage with an altered voltage level. The respective portions of the transformed AC voltage are transferred to a plurality of bridges that are coupled to the secondary windings. Each of the plurality of bridges receives the respective portion of the transformed AC voltage and converts the respective portion to provide a respective portion of an output DC voltage. The plurality of bridges are coupled in parallel to combine the respective portions of the output DC voltage to provide the output DC voltage. As used herein, the terms "a" and "an" do not denote a limitation of quantity, but rather denote the presence of at least one of the referenced item, and the term "coupled" or "coupling" includes any suitable type of coupling and also includes both direct coupling and indirect coupling.

Figure 1:
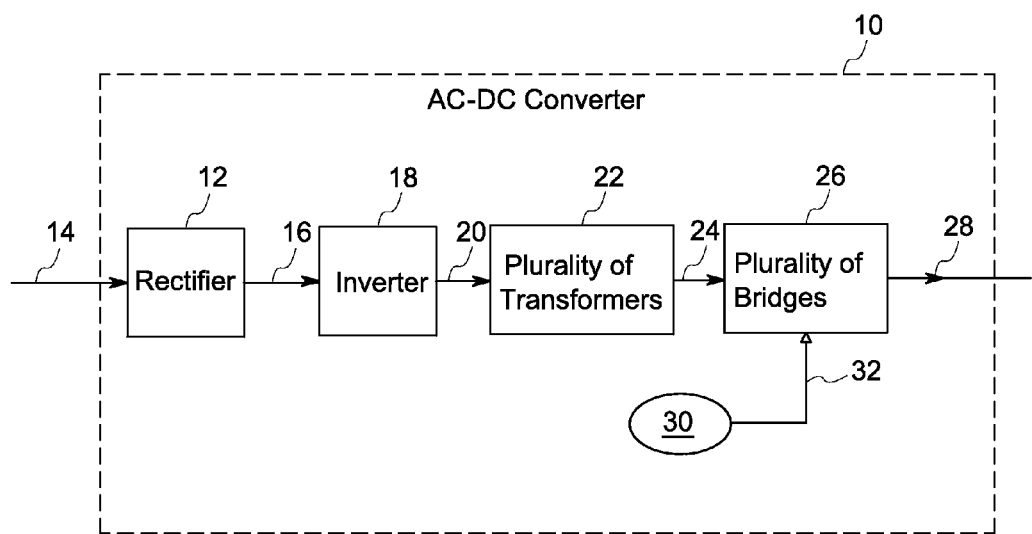
FIG. 1 is a block diagram representation of an alternating current to direct current (AC-DC) power converter in accordance with an embodiment of the invention.

FIG. 1 is a block diagram representation of an AC-DC power converter 10 in accordance with an embodiment of the invention. Although single lines are used for purposes of example, each of the coupling lines in FIG. 1 typically represents multiple lines/cables. The AC-DC power converter 10 includes a rectifier 12 that receives an input AC voltage 14 from a power source (not shown). In one embodiment, the input AC voltage 14 may include a varying frequency input AC voltage. The rectifier 12 converts the input AC voltage 14 to an initial pulsating DC voltage 16. In an exemplary embodiment, the rectifier 12 may include a diode bridge. The initial pulsating DC voltage 16 is transferred to an inverter 18 that converts the initial pulsating DC voltage 16 to a converted high frequency AC voltage 20. The high frequency AC voltage 20 is transferred to a plurality of transformers 22. One, more than one, or all of the transformers operate to alter a voltage level of a respective portion of the converted high frequency AC voltage 20. In one embodiment, at least one of the transformers operates to decrease the voltage level of the respective portion of the converted high frequency AC voltage 20. The transformed high frequency AC voltage 24 is transmitted to a plurality of bridges 26 that convert the transformed high frequency AC voltage 24 to an output DC voltage 28. The plurality of bridges 26 are controlled by a bridge controller 30 that controls operations of the plurality of bridges 26 and provides control signals 32 to switch the plurality of bridges 26 between conducting and non-conducting states. The controller 30 uses feedback regulation for operating bridges 26 to ensure that the output DC voltage 28 is maintained at a regulated level and AC input current drawn by rectifier 12 has a desirable shape such as unity power factor sinusoidal waveform. Although one controller 30 is shown for purposes of example, control functionality may be present in either one physical unit or multiple physical units. In a particular embodiment, the AC-DC power converter 10 converts a varying frequency input AC voltage to an output DC voltage. If desired, AC-DC power converter 10 may alternatively be used to convert a constant frequency input AC voltage.

Figure 2:
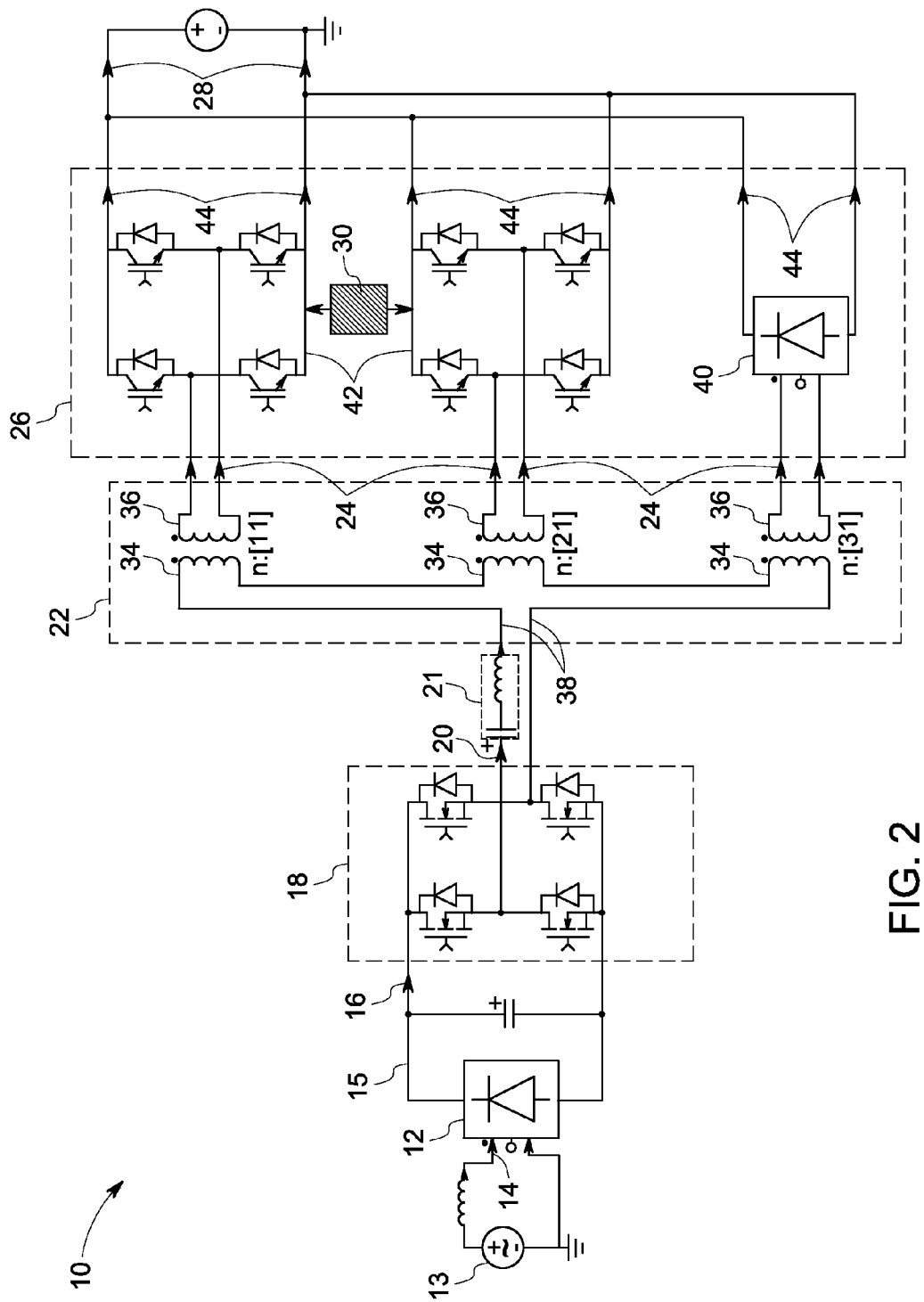
FIG. 2 is a detailed schematic representation of an AC-DC power converter depicting coupling between the various components of the AC-DC converter in accordance with an embodiment of the invention.

FIG. 2 is a detailed schematic representation of the AC-DC converter 10 depicting coupling between the various components of the AC-DC converter 10 in accordance with an embodiment of the invention. The rectifier 12 in the AC-DC converter 10 is coupled to a power source 13 that provides the input AC voltage 14 to the rectifier 12. The rectifier 12 converts the input AC voltage 14 to the initial pulsating DC voltage 16 and transfers the initial pulsating DC voltage 16 to the inverter 18, which is coupled to the rectifier 12 via a DC link 15. The inverter 18 converts the initial pulsating DC voltage 16 to the high frequency converted AC voltage 20. In one embodiment, the inverter 18 includes multiple semiconductor devices. In a more specific embodiment, the semiconductor devices include metal oxide semiconductor field effect transistor switches. The semiconductor devices are coupled to form an inverter and convert the initial pulsating DC voltage 16 received by the inverter 18 to the high frequency converted AC voltage 20. In an exemplary embodiment, the inverter 18 operates at least partially in a duty cycle mode to provide the converted high frequency AC voltage 20. In a more specific embodiment, the inverter 18 operates in a square wave mode.

The converted high frequency AC voltage 20 is transferred to the plurality of transformers 22. At least one of the transformers alters the voltage level of a respective portion of the converted AC voltage 20 received by the at least one transformer. In specific embodiments, all or all except for one of the transformers decreases the voltage level of its respective portion of the converted high frequency AC voltage 20 and are coupled with a resonant circuit 21 to provide low switching losses in the inverter 18 and to allow switching of the inverter and bridges under substantially zero voltage or zero current conditions. Each of the plurality of transformers 22 includes a primary winding 34 paired to a secondary winding 36. Furthermore, each of the primary windings 34 is coupled in series to the other primary windings, and the series coupled primary windings 38 are coupled to the inverter 18. The converted high frequency AC voltage 20 provided by the inverter 18 is split into multiple portions based upon the plurality of transformers 22 such that each of the transformers 22 receives its respective portion of the converted high frequency AC voltage 20. The respective portion of the converted high frequency AC voltage 20 is received by a respective primary winding 34 of each of the transformers 22. The respective primary windings 34 are inductively coupled to their respective secondary windings 36 that receive the respective portion of the converted high frequency AC voltage 20. The secondary windings 36 either alter or maintain the voltage level of the converted high frequency AC voltage 20 to provide the transformed high frequency AC voltage 24. In one embodiment, at least one of the plurality of transformers 22 includes a different turn ratio of the primary winding 34 and the secondary winding 36 than another of the plurality of transformers.

The respective portions of the transformed high frequency AC voltage 24 are transferred to the plurality of bridges 26. Some or all of the bridges are controlled by a bridge controller 30. In one embodiment, the plurality of bridges 26 includes at least one non-controllable bridge 40 and at least one controllable bridge 42. In a more specific embodiment, the plurality of bridges 26 includes one non-controllable bridge 40 and two controllable bridges 42. Each of the plurality of bridges 26 is electrically coupled to a respective secondary winding 36 and receives a respective portion of the transformed high frequency AC voltage 24. The bridge controller 30 controls the switching of the at least one controllable bridge 42 between a conducting and a non-conducting state to convert the respective portion of the transformed high frequency AC voltage 24 to a respective portion of a DC voltage 44. In one embodiment, the at least one non-controllable bridge 40 includes a diode bridge and the at least one controllable bridge 42 includes semiconductor devices such as insulated gate bipolar transistors. In another embodiment, at least one of the plurality of controllable bridges operates in a square waveform mode or a bypassed mode.

The bridges 26 are combined in parallel to form the output DC voltage 28. In one embodiment, the output DC voltage 28 includes a regulated output level. The regulated output DC voltage is provided at the output of the AC-DC converter 10 by operating the plurality of bridges 26 in collaboration with the plurality of transformers 22 with different turn ratios such that any variation in the frequency or voltage of the input AC voltage 14 does not affect the level of the output DC voltage 28.

Figure 3:
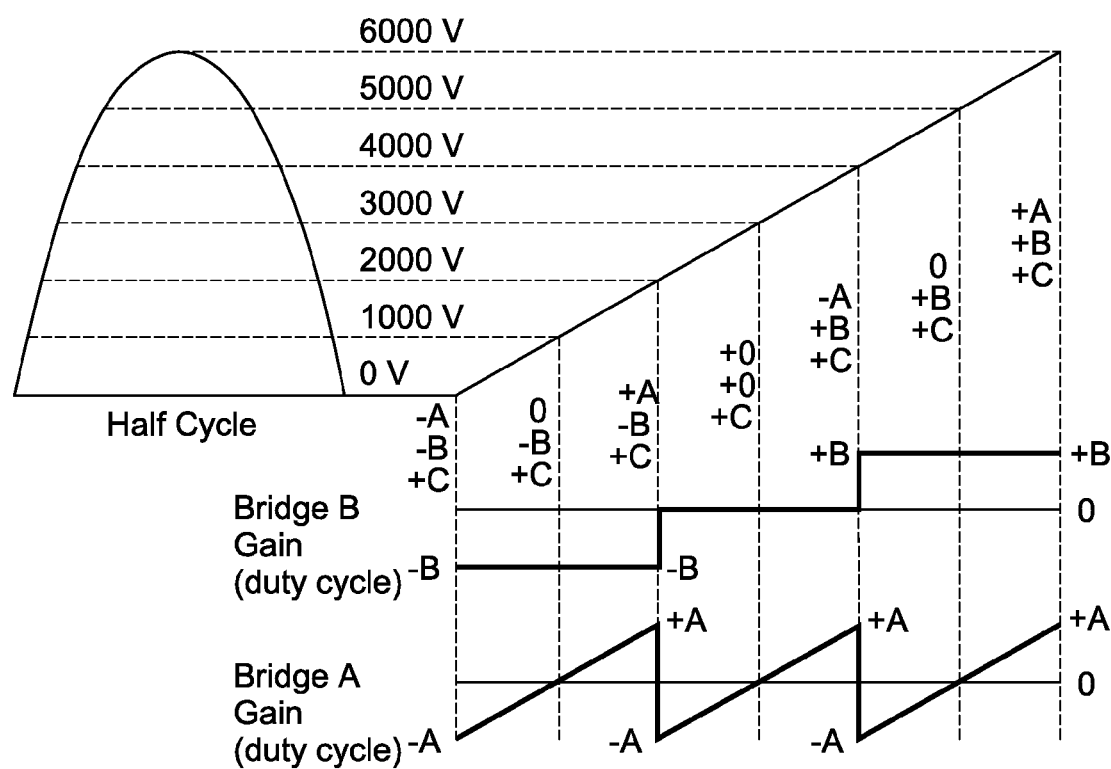
FIG. 3 is a graphical representation of the method for controlling the plurality of bridges in accordance with an embodiment of the invention.

FIG. 3 is a schematic representation of a method for controlling the plurality of bridges depicting the duty cycle control of the plurality of bridges with respect to the point of waveform of the pulsating DC bus voltage 15 for an exemplary peak DC voltage of 6000 V. In this embodiment, a non-controllable bridge referred as "Bridge C" is an unregulated diode bridge, one of the controllable bridges referred as "Bridge B" is operated either at full positive or negative duty cycle, and the remaining controllable bridge "Bridge A" is operated in a continuously varied duty cycle to regulate the input AC current waveform and output DC voltage.

Figure 4:
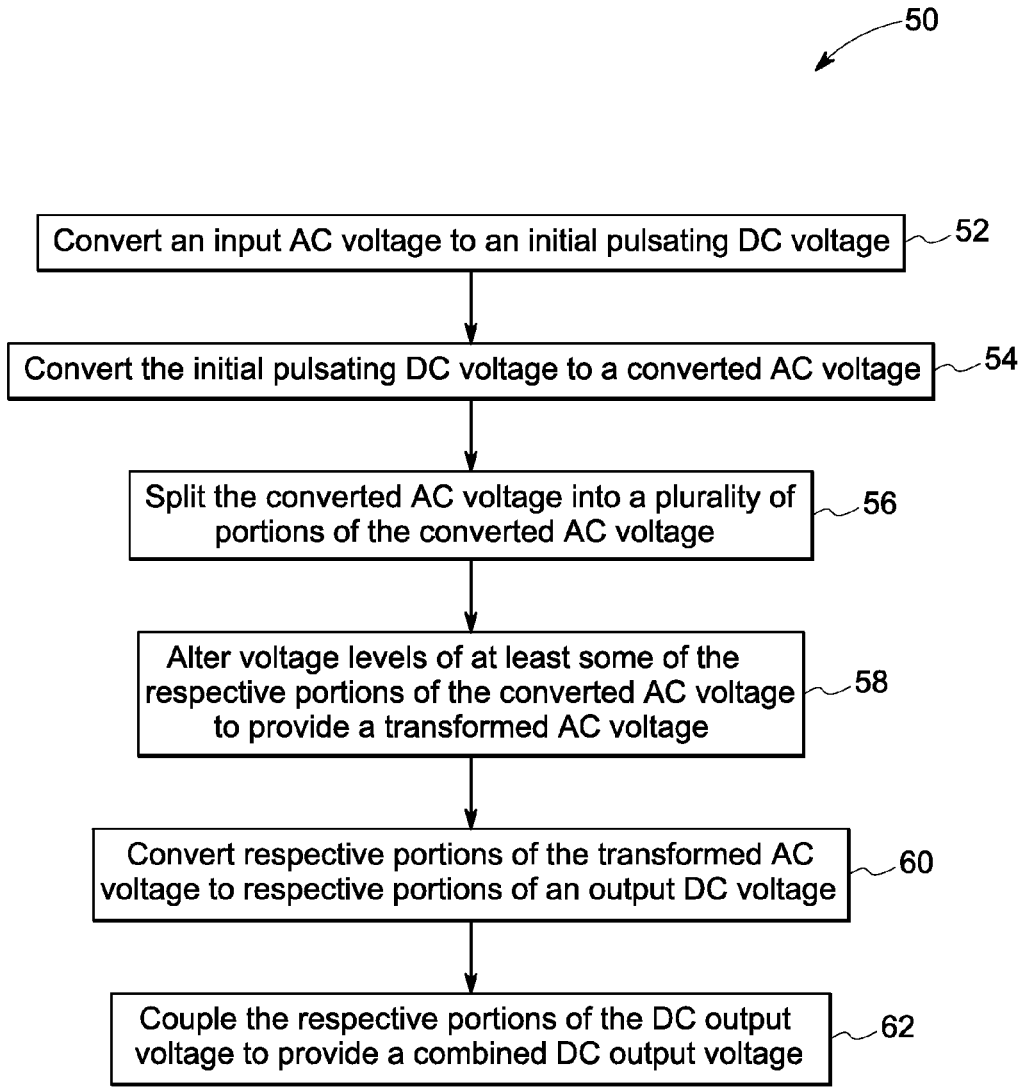
FIG. 4 is a flow chart representing the steps involved in a method for power conversion in accordance with an embodiment of the invention.

FIG. 4 is a flow chart representing the steps involved in a method 50 for power conversion in accordance with an embodiment of the invention. The method 50 includes converting an input AC voltage to an initial pulsating DC voltage in step 52. The initial pulsating DC voltage is converted to a converted high frequency AC voltage by a inverter in step 54. In one embodiment, the initial pulsating DC voltage is converted to a converted high frequency AC voltage by operating the inverter at a partial duty cycle mode. In a more specific embodiment, the inverter is operated in a square wave mode. Furthermore, the converted high frequency AC voltage is split into a plurality of portions of the converted high frequency AC voltage in step 56. The voltage level of at least some of the plurality of portions is altered to provide respective portions of a transformed high frequency AC voltage in step 58. In one embodiment, the voltage level of the respective portions of the converted high frequency AC voltage is decreased at different levels by using a plurality of transformers with at least some of the transformers having different turns ratios than others of the plurality of transformers to provide the voltages at different levels. The respective portions of the transformed high frequency AC voltage are converted to respective portions of DC output voltage in step 60. In one embodiment, the respective portions of the transformed high frequency AC voltage are converted by switching at least one of the bridges at frequencies at or above a few kilohertz. In another embodiment, switching of the at least one of the bridges is controlled by a bridge controller. In a more specific embodiment, the bridge controller controls switching of at least two of the plurality of bridges, and at least one other of the bridges comprises a non-controllable bridge. In an exemplary embodiment, respective portions of the transformed high frequency AC voltage are converted by operating at least one of the bridges in a square waveform mode. The respective portions of the DC output voltage are combined in parallel to provide a combined output DC voltage in step 62.

The various embodiments of the AC-DC converter described above provide a more efficient and less expensive AC-DC converter. When the AC-DC converter primarily employs a square wave mode of operation with resonant circuits for soft switching, reduced losses and increased efficiency result. Also, large and costly filters are not needed.

It is to be understood that a skilled artisan will recognize the interchangeability of various features from different embodiments and that the various features described, as well as other known equivalents for each feature, may be mixed and matched by one of ordinary skill in this art to construct additional systems and techniques in accordance with principles of this disclosure. It is, therefore, to be understood that the appended claims are intended to cover all such modifications and changes as fall within the true spirit of the invention.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An alternating current to direct current (AC to DC) power conversion system comprising;
   a rectifier configured to convert an input AC voltage to an initial DC voltage;
   an inverter configured to convert the initial DC voltage to a converted AC voltage;
   a plurality of transformers, each transformer comprising a primary winding paired to a secondary winding, wherein each of the primary windings is coupled in series with the other primary windings, wherein the series coupled primary windings are coupled to the inverter to receive the converted AC voltage; and
   a plurality of bridges, each bridge coupled to a respective secondary winding to receive a transformed AC voltage therefrom, each bridge coupled in parallel to the other bridges at DC output terminals to provide a combined DC output voltage.

2. The system of claim 1, further comprising a bridge controller configured to control operations of at least some of the plurality of bridges for regulating the output DC voltage and shape AC current supplied to the rectifier.

3. The system of claim 1, wherein the plurality of bridges comprises at least one non-controllable bridge and at least one controllable bridge.

4. The system of claim 3, wherein the plurality of bridges comprises one non-controllable bridge and at least two controllable bridges.

5. The system of claim 3, further comprising a bridge controller for controlling switching of the at least one controllable bridge between a bypassed and a non-bypassed state.

6. The system of claim 1, wherein at least one of the plurality of bridges operates in a square wave mode.

7. The system of claim 1, wherein at least one of the plurality of bridges operates in a duty cycle modulated mode.

8. The system of claim 1, wherein the inverter comprises a plurality of semiconductor devices.

9. The system of claim 1, wherein the inverter operates at least partially in a duty cycle mode.

10. The system of claim 1, wherein the AC to DC power conversion system includes a resonant circuit coupled between the inverter and the transformers.

11. The system of claim 1, wherein at least one of the plurality of transformers comprises a different turns ratio of the primary winding and the respective secondary winding than another of the plurality of transformers.

12. The system of claim 10, wherein the resonant circuit comprises a capacitor and inductor configured to allow switching of the inverter and bridges under substantially zero voltage or zero current conditions.

13. A method for power conversion comprising:
   converting an input AC voltage to an initial DC voltage;
   converting the initial DC voltage to a converted AC voltage;
   splitting the converted AC voltage into a plurality of portions of the converted AC voltage;
   altering voltage levels of at least some of the respective portions of the converted AC voltage to provide portions of transformed AC voltage;
   converting respective portions of the transformed AC voltage to respective portions of an output DC voltage; and
   coupling the respective portions of the output DC voltage to provide a combined output DC voltage.

14. The method of claim 13, wherein converting the respective portions of the transformed AC voltage comprises switching at least one of the bridges at frequencies at or above a few kilohertz.

15. The method of claim 14, wherein switching of the at least one of the bridges is controlled by a bridge controller such to regulate the output DC voltage and shape AC current supplied to the rectifier.

16. The method of claim 13, wherein converting the initial DC voltage to the converted AC voltage comprises operating an inverter at a partial duty cycle mode.

17. The method of claim 13, wherein converting the initial DC voltage to the converted AC voltage comprises operating an inverter in a square wave mode.

18. The method of claim 13, wherein converting the respective portions of the transformed AC voltage comprises operating at least one of the bridges in a square waveform mode.

19. The method of claim 13, wherein converting the respective portions of the transformed high frequency AC voltage comprises operating at least one of the bridges in a duty cycle modulation mode.

20. The method of claim 13, wherein altering the voltages of the respective portions of converted AC voltage comprises altering the voltages at different levels using a plurality of transformers with at least some of the transformers having different turns ratios than others of the plurality of transformers to provide the voltages at different levels.

* * * * *